Oct. 28, 1941.  F. M. REID  2,260,641
TRACTOR-TRAILER BRAKE MECHANISM
Filed Feb. 27, 1941  2 Sheets-Sheet 1
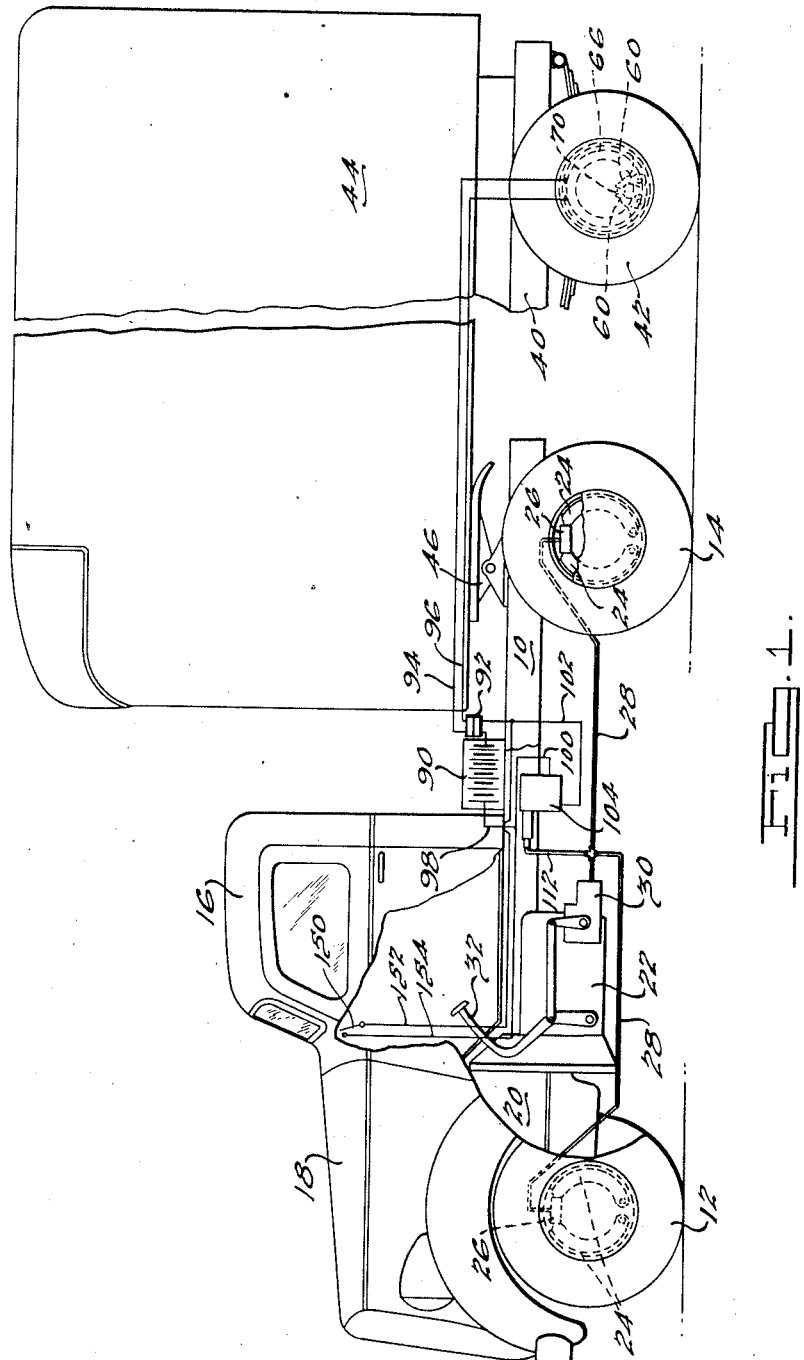
INVENTOR
Frederick M. Reid.
BY
Harness, Dickey & Pierce.
ATTORNEYS.

Oct. 28, 1941.    F. M. REID    2,260,641
TRACTOR-TRAILER BRAKE MECHANISM
Filed Feb. 27, 1941    2 Sheets-Sheet 2
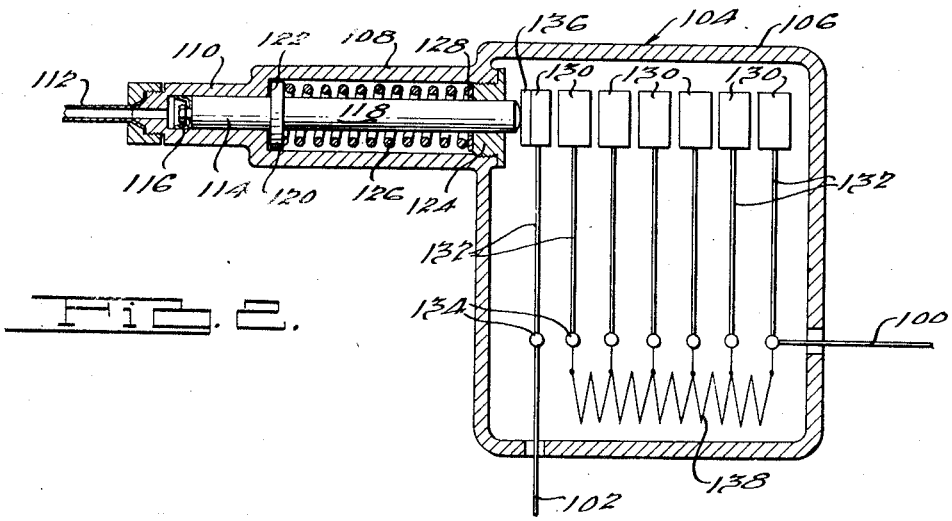
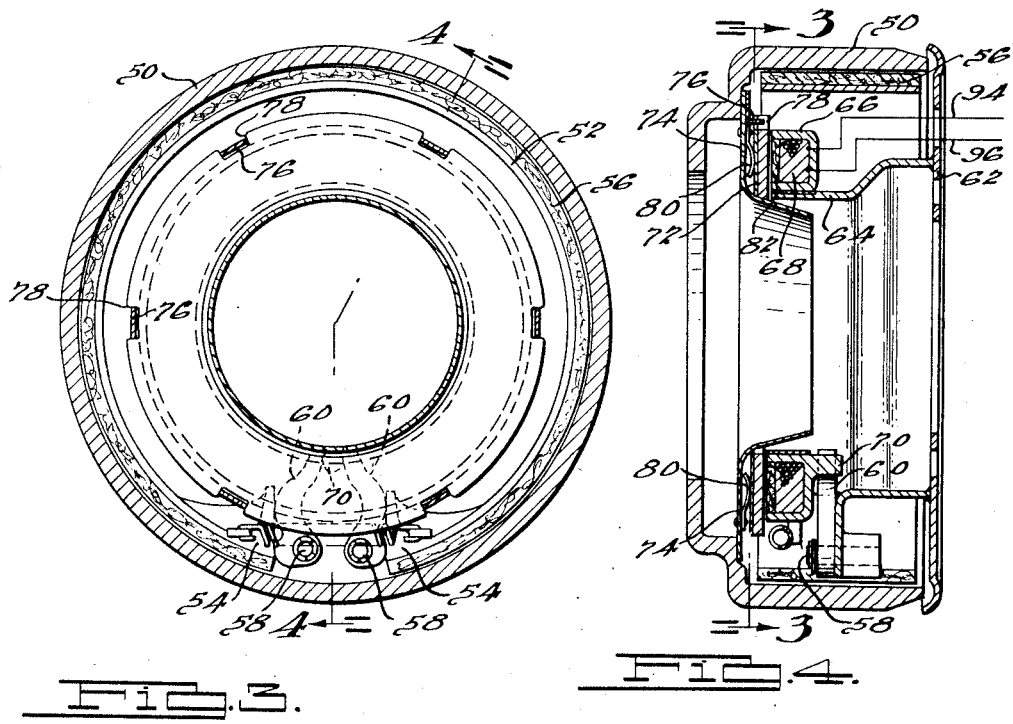
INVENTOR
Frederick M. Reid.
BY
Harness, Dickey & Pierce.
ATTORNEYS.

UNITED STATES PATENT OFFICE 2,260,641

TRACTOR-TRAILER BRAKE MECHANISM

Frederick M. Reid, Detroit, Mich., assignor to Fruehauf Trailer Company, Detroit, Mich., a corporation of Michigan Application February 27, 1941, Serial No. 380,799

1 Claim. (Cl. 188—3)

This invention relates to brake mechanism for a tractor-trailer combination and particularly to such combination wherein the tractor is provided with fluid operated brakes and the trailer is provided with electrically operated brakes, the principal object being the provision of means whereby operation of the brakes on the tractor effects simultaneous operation of the brakes on the trailer, the intensity of the braking effect on the trailer being dependent upon the intensity of the braking effect on the tractor.

Objects of the invention include the provision of a novel form of means for effecting application of electrically operated brakes on a trailer simultaneously with actuation of fluid-operated brakes on a coupled tractor and to a degree commensurate with the degree of braking effect applied to the tractor by the fluid operated brakes; the provision of means for effecting a controlled application of electrically operated brakes on a trailer in accordance with the intensity of application of fluid operated brakes on a coupled tractor; the provision of a control mechanism between the electrically operated brakes on a trailer and the fluid operated brakes on a coupled tractor including a pressure sensitive element connected into the braking system for the tractor and movable in response to pressure variations therein and a variable resistance between the brakes of the trailer and their source of electrical energy so connected to the pressure sensitive element as to be simultaneously controlled thereby whereby to vary the effect of the resistance in the circuit for the trailer brakes and, therefore, the effectiveness of the latter during application; and the provision of a novel form of mechanism for coupling electrically operated brakes on a trailer to fluid operated brakes on a tractor connected thereto whereby operation of the brakes on the tractor effects simultaneous operation of the brakes on the trailer and to a degree commensurate with the degree of application of the brakes on the tractor.

The above being among the objects of the present invention the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a more or less diagrammatic, partially broken side elevational view of a tractor-trailer combination embodying braking mechanisms constructed in accordance with the present invention;

Fig. 2 is an enlarged vertical sectional view taken centrally through the control unit employed to correlate the actuation of the brakes on the trailer with actuation of the brakes on the tractor in the construction shown in Fig. 1;

Fig. 3 is an enlarged sectional view of an electrically operated wheel brake such as is suitable for use on the trailer in connection with the present invention, the view being taken perpendicular to the axis of the cooperating brake drum as on the line 3—3 of Fig. 4; and, Fig. 4 is a sectional view of the brake mechanism shown in Fig. 3 taken as on the line 4—4 thereof.

The use of electrically operated brakes on the wheels of trailers, and particularly trailers of the commercial types, is increasing in popularity for a number of different reasons, one of which is the ease with which the trailer brakes may be coupled to the tractor for operation therefrom. There is, however, one outstanding disadvantage of such electrically operated brakes as thus far provided and that is that any application of the brakes on the tractor which is coupled thereto effects full actuation of the brakes on the trailer, whereas it is, of course, desirable that the degree of braking effect applied to a trailer upon application of the brakes on the connected tractor be proportional to a greater or lesser extent to the effect of the braking effort on the tractor.

Tractors and particularly those of the commercial type to which the present invention is particularly applicable, although not necessarily limited, are conventionally provided with one of three standard types of braking systems. The most widely used system is probably the hydraulic braking system although air braking systems, either of the positive pressure or of the vacuum type are also popular and are widely used. The third type of system is the straight mechanical types of braking systems which are invariably provided with some booster mechanism for aiding in the application of the brakes and which booster mechanisms may be actuated either by air under a positive pressure or by vacuum. Such booster mechanisms are also occasionally applied to the hydraulic types of brake operating systems. In any event it will be appreciated that in all of these systems fluid under pressure is employed in one manner or another to cause operation of the brakes and likewise in all of these systems the greater the pressure differential in the systems the greater the degree of braking effect applied to the tractor thereby. The present invention is applicable to any one of these types of systems wherein a fluid pressure differential in the system is employed in the application of the brakes on the tractor and in which the amount of the pressure differential may be varied in accordance with the amount of braking effect desired. Consequently it will be appreciated that strictly mechanical brakes employing a fluid pressure operated booster is included in the class of braking mechanisms to which the present invention is applicable and the term "fluid operated braking systems" or equivalent term employed in the following specification and claims will be understood to include any of the above described brake operating systems or their equivalent. It will also be understood from the above that in the illustrative embodiment of the present invention shown in the accompanying drawings and hereinafter explained the use of hydraulic brakes on the tractor is illustrative only of one form of the present invention and is shown by way of illustration and not by limitation, the changes required to adapt the particular construction shown to brakes of either the positive or negative air operated types or to brakes with boosters thus being made apparent to those skilled in the art.

It is well understood by those skilled in the art that any modulation of the effectiveness of electrically operated brakes upon application of the same can be accomplished only by variation in the amount of electrical energy applied to the brakes. Accordingly, where it is desired to vary the effectiveness of electrically operated brakes upon application thereof means must be provided for varying the flow of electrical energy thereto. The simplest way of accomplishing this result is simply to insert a variable resistance in the circuit between the electrically operated brakes and their source of electrical energy, and such variable resistance is employed in accordance with the present invention. Such variable resistance in order to be variable must have some movable means through movement of which the effective resistance of the same may be varied. In accordance with the present invention the movable element of such variable resistance is caused to move through variations of pressure in the fluid braking systems of the tractor through the use of a pressure responsive element subject to the pressure variations in the fluid operated braking system of the tractor. In this manner the resistance to flow of electrical energy to the electrically operated brakes of the tractor may be caused to vary simultaneously with variations in pressure in the fluid operated braking system of the tractor, and the two may be so correlated as to obtain the desired proportional amounts of braking effect upon both the trailer and the tractor during application of brakes to the tractor.

It will be understood that as far as the present invention is concerned any suitable type of electrically operated brake mechanism may be employed for the trailer, the particular construction shown in the drawings and described hereafter being illustrative only of this general type of braking system, the particular construction shown being one commercial form now found on the market.

Referring now to the drawings and particularly to Fig. 1 in which a tractor-trailer combination is illustrated, it will be noted that the tractor includes a frame structure 10 supported by front wheels 12 and rear wheels 14, that it is provided with the usual cab 16 and hood 18, the latter covering a conventional power plant 20 which may be of any conventional design and construction and which operates through a transmission mechanism indicated generally at 22 to drive the rear wheels 14 in a conventional manner. As previously mentioned, for the purpose of illustration the tractor is shown as being provided with hydraulically actuated brakes, these including shoes 24 conventionally associated with the brake drum of each of the wheels 12 and 14 together with associated wheel brake cylinders 26, the latter being connected by suitable supply line 28 with a master cylinder 30 conventionally mounted upon the transmission 22 of the tractor and coupled for actuation to the usual manually operated brake pedal 32.

The trailer is illustrated as a conventional type of semi-trailer having a frame 40, rear wheels 42 and body 44. It is releasably connected to the tractor by any suitable or conventional form of fifth wheel mechanism indicated generally at 46 and through which the forward end of the trailer is supported upon the rear end of the tractor. As previously mentioned the wheels 42 of the trailer are equipped with electrically operated brakes and while any suitable type of such electrically operated brakes may be employed in accordance with the present invention, the specific type illustrated in Figs. 3 and 4 by way of illustration and in a more or less diagrammatic manner are constructed and operated substantially in the following manner.

Referring to Figs. 3 and 4 the brake drum is illustrated at 50, it being understood that one of such drums is secured to each of the wheels 42 in a conventional manner. Within the drum 50 is a brake band 52 of conventional construction having radially inwardly directed flanges or brackets 54 at the free ends thereof in opposed but spaced relation. The brake band 52 is provided with the usual lining 56 for frictional engagement with the inner surface of the drum 50 in accordance with conventional practice. Pivotally mounted at 58 between the brackets 54 are a pair of cam levers 60 one bearing against each of the brackets 54. The levers 60 are mounted on the backing plate member 62 which is fixed to the stationary axle or axle housing of the trailer in a conventional manner.

As best illustrated in Fig. 4 the backing member 62 is provided with an axially extending annular collar 64 concentric with the brake drum 50 and rotatably mounted thereon in an annular magnet member 66 enclosing a coil of wire 68. The member 66 is provided with a pin portion 70 which is interposed between the free ends of the cam levers 60. Thus it will be appreciated that any rotational movement of the magnet member 66 in either direction will act against either one or the other of the cam levers 60 to rotate the same and in rotating such cam lever will bear against the cooperating bracket 54 of the brake band to move it circumferentially of the brake drum 50 to thereby effect engagement of the same with the interior surface of the brake drum, the opposite end of the brake band being held against movement through contact of its corresponding bracket 54 with the corresponding cam lever 60.

In order to effect such rotational movement of the magnet member 66 upon energization thereof a magnetically attractable ring or annulus 72 is mounted in the brake drum 50 for rotation therewith. The particular manner of mounting the ring 72 as illustrated comprises a sheet metal plate 74 fixed to the interior surface of the brake drum 50 and provided with axially parallel fingers 76 which are received in notches 78 in the periphery of the ring 72, thus permitting a limited amount of axial movement of the ring 72 with respect to the brake drum 50. Preferably some means such as light springs 80 are provided between the plate 74 and the ring 72 to constantly urge the ring 72 towards the magnet member 66 which itself is maintained against relative axial movement on the sleeve 64. The springs 80 preferably constantly urge the ring 72 into very light engagement with the cooperating face of the magnet member 66 but not under a sufficiently great pressure to establish an undesirable amount of friction between these parts when the brake is inoperative. Furthermore, the operative face of the magnet member 66 is preferably provided with friction material 82 for engagement with the ring 72 so as to enhance the drag between these parts during application of the brakes.

With the construction as above described it will be appreciated that when the coil 68 is energized the magnet member 66 will attract the ring 72 toward it, bringing it into frictional engagement therewith and if the brake drum 50 is rotating at such time it will cause the magnet member 66 to tend to rotate therewith and in rotating will act through the pin 70 to expand the brake band 52. The amount which the brake band 52 will thus expand and, therefore, the amount of braking effect which the brake band will apply to the brake drum 50 will depend upon the amount of drag between the magnet member 66 and the ring 72 which in turn will depend upon the amount of electrical energy supplied to the coil 68. The amount of electrical energy flowing to the coil 68 is, in accordance with the present invention, controlled by inserting a variable resistance between the coil 68 and its source of electrical energy and varying this resistance in accordance with the amount of braking effect desired on the trailer.

The source of energy for the coil 68 is the battery 90 illustrated in Fig. 1 as mounted on the tractor. It will, of course, be appreciated that this may be the same battery as is conventionally employed by the tractor for furnishing electrical energy to the ignition system of the power plant 20, the various lights for the tractor and trailer, etc. It is connected through a readily separable connection of conventional construction illustrated diagrammatically at 92 with leads 94 and 96 on the trailer extending to the coil 68 of both trailer brakes. As illustrated in Fig. 1 one lead from the battery, namely the righthand lead, extends directly to the connection 92 and the other lead 98, 100, 102 passes through a control unit indicated generally at 104 in Fig. 1 and by means of which the result of the present invention is obtained.

As previously mentioned this control unit of the present invention involves a pressure responsive element actuated by variations in pressure in the braking system for the tractor and a variable resistance element in the circuit between the battery 90 and the electrically operated wheel brakes of the trailer, the pressure responsive element and the variable resistance being connected for simultaneous operation whereby variations in pressure in the tractor braking system cause variations in the magnetic effect exerted by the trailer brakes and consequently a corresponding variation in the braking effect upon the trailer. Any suitable type of pressure responsive element having a part or element movable in response to variations in pressure therein and any type of variable resistance having a movable element for varying the effective resistance of the resistance unit may be employed, the particular types of such elements shown being merely illustrative of one type of mechanism that may be employed for the purpose.

In the particular construction of control unit 104 shown it will be noted, as illustrated in Fig. 2, that it includes a casing 106 of substantially rectangular section and which may be mounted on the tractor in any suitable manner, and from one edge of which projects a tubular extension 108 which terminates in a cylinder 110. The cylinder 110 is connected by the tube 112 into the leads 28 extending between the master cylinder 30 and the wheel brake cylinders 26 as brought out in Fig. 1. The cylinder 110 reciprocably receives a piston 114 therein the lefthand end of the latter as viewed in Fig. 2 being provided with a conventional form of cup packing 160. The piston 114 is provided with an elongated extension 118 which projects through the full length of the tubular portion 108 and is provided with a collar 120 fixed thereto which is adapted to engage the shoulder 122 formed at the junction between the portion 108 and the cylinder 110 to limit movement of the piston 114 to the left as viewed in Fig. 2. The righthand end of the extension 118 is guided for axial movement in an apertured plug member 124 threaded into the righthand end of the tubular extension 108 and a coil spring 126 surrounds the extension 108 and is maintained under compression between the plug 124 and the collar 120, thus serving to constantly urge the piston 114 to the left as viewed in Fig. 2. The cylinder 110, piston 114 and spring 126 thus form a pressure responsive device of one design suitable for use in the present invention.

From the above description it will be appreciated that the lefthand end of the piston 114 as viewed in Fig. 2 is always simultaneously subjected to the same pressures as exist in the hydraulic brake system for the tractor and that, therefore, when the brake pedal 32 is depressed and the master cylinder 20 is thereby actuated to expel oil under pressure into the lead 28 leading to the wheel brake cylinders 26, the pressure of such oil is transmitted through the tube 112 to the piston 114 thereby tending to move the piston 114 to the right as viewed in Fig. 2 against the force of the spring 26. Obviously the amount which the piston which the piston 114 will move under such circumstances and with a spring 126 of given strength will depend entirely upon the amount of pressure exerted in the hydraulic braking system, and inasmuch as the braking effect on the tractor is directly proportional to the amount of pressure applied in the hydraulic braking system, movement of the piston 114 will be proportional to such braking effect on the tractor. It is, of course, possible that the movement of the piston 114 in one installation may desirably be larger or smaller than in another installation under the same variations in pressure, and the desired results may be obtained under such conditions by either replacing the spring 126 by one having different characteristics, by threading the plug 124 inwardly or outwardly in the extension 108, or by adding or subtracting washers such as the washer 128 illustrated in Fig. 2 between the plug 124 and the cooperating end of the spring 126.

As previously explained it is the movement of the piston 114 which in the particular form of construction illustrated is utilized to vary the resistance interposed in the circuit between the electrically operated brakes of a trailer and their source of supply, namely the battery 90 in the construction shown, and in order to enable the movement of the piston 114 to accomplish this result the extension 118 is projected through the plug 124 and into the casing 106 in which the variable resistance is located. Also as previously explained the particular type of construction of variable resistance employed is unimportant particularly in the broader aspects of the present invention providing it is equipped with one or more movable elements which may be connected for movement to the piston 114 and movement of which serves to vary the amount of resistance effective in the circuit to the wheel brakes for the trailer.

The particular form of variable resistance illustrated in Fig. 2 consists of a plurality of aligned electrical contact elements 130 each of which is supported upon the free end of a resilient flat spring-like conductor element 132 the opposite end of each of which is fixed with respect to the casing 106 as at 134. Preferably the lefthand contact 130 as illustrated in Fig. 2 is provided with a wear plate 136 of electrical insulation material for direct contact with the extension 118 of the piston 114 as shown. The lead 100 is connected to the righthand conductor 132 as illustrated in Fig. 2 and the lead 102 to the lefthand conductor 132. An electrical resistance element 138 is extended between the righthand conductor 132 as viewed in Fig. 2 and that conductor 132 immediately to the right of the lefthand one thereof and is connected into the intervening conductors 132 in such a manner that equal increments of it are interposed between each pair of the thus connected conductors 132. In other words, preferably but not necessarily equal increments of the resistance 132 are interposed between each pair of adjacent conductors 132 excepting only the two conductors 132 at the extreme left of the construction shown.

The conductors 130 are so constructed and arranged that when in normally inoperative position they are arranged in closely adjacent but slightly spaced relation with respect to each other, the spacing, of course, being such as to prevent the possibility of arcing between them. It will thus be appreciated that when the brakes are in inoperative position, that is when the pressure in the fluid brakes of the tractor is atmospheric and the piston 114 therefor to its extreme position to the left as viewed in Fig. 2, the two lefthand contacts 132 being separated under such circumstances, the circuit between the leads 100 and 102 is open and, therefore, no electrical energy can flow to the wheel brakes to effect operation thereof. However, if the tractor brakes are applied and the pressure therefrom is exerted against the end of the piston 114, the piston 114 in moving to the right as viewed in Fig. 2 will first bring the two lefthand contacts 130 into engagement with each other and thereby close the circuit between the leads 100 and 102 therethrough but electrical energy flowing through such circuit must flow through the entire length of the resistance 138 which, therefore, permits a minimum amount of electrical energy to be applied to the trailer brake and, therefore, a correspondingly light application of the same will result. If enough pressure is applied to the hydraulic braking system to the piston 114 to bring the first three contacts 130 on the lefthand side as viewed in Fig. 2 into contact, then that portion of the resistance 138 between the second and third conductors 132 will be shorted out with the result that less resistance will be offered to the flow of electrical energy between the leads 100 and 102 and consequently a greater amount of electrical energy will be applied to the trailer brakes to effect a more forceful application of the same.

In a corresponding manner as the pressure in the hydraulic braking system of the tractor increases, causing the piston 114 to move further to the right as viewed in Fig. 2, the contacts 130 will come into contact one after the other and correspondingly short circuit their portion of the resistance 138 until, when a desired maximum pressure is applied in the hydraulic braking system, all of the contacts 130 will be caused to engage in succession thereby completely short circuiting the resistance 138 and applying the full potential of the battery 90 to the trailer brake to effect maximum application thereof.

It will, of course, be appreciated that any number of contacts 130 may be employed to get any range of variation or modulation of the effect of the trailer brakes desired, the particular number shown having been found satisfactory for practical purposes.

From the above description it will be appreciated that with the construction shown and described the application of the brakes on the trailer is controlled entirely by the application of the brakes on the tractor and that the intensity of the brake application on the trailer is automatically varied to correspond with the intensity of brake application on the tractor. Obviously the construction may be so arranged and adjusted that an equal braking effect on the trailer and tractor will occur, or a greater or lesser braking effect on the trailer than on the tractor may be provided if desired. In any event the intensity of the braking effect on the trailer will increase with increasing intensity of the braking effect on the tractor and thus a modulation of the braking effect on the tractor is obtained varying in proportional relation to the braking effect on the tractor.

Occasions may arise where it is desirable to apply the brakes on the trailer without requiring a corresponding application of the brakes on the tractor and provisions for obtaining this result are illustrated in Fig. 1. Such means consists of a manually operable switch illustrated generally at 150 which may conveniently be mounted on the instrument panel in the cab 16 with one side thereof connected by a lead 152 to the lead 102 and the other side thereof connected by a lead 154 with the lead 98. It will be appreciated that with this arrangement whenever the switch 150 is closed it will close the circuit between the battery 90 and the electrically operated brakes for the trailer independently of the control unit 104. Consequently when the switch 150 is closed full application of the brakes on the trailer is obtained regardless of the condition of application of the brakes on the tractor. Such arrangement is particularly useful where a stop is made on a slight grade and the operator cannot conveniently maintain the pedal 32 on the tractor in depressed condition.

What I claim is:

In a tractor-trailer combination of the class wherein the tractor is provided with a hydraulic braking system and the trailer is equipped with electrically operated brakes connected in circuit with a suitable source of electrical energy, the combination with said hydraulic braking system and said electrically operated brakes of a unit operatively interconnecting the same, said unit comprising an element movable under the influence of pressure variations and operatively connected to said hydraulic braking system for movement simultaneously with variations in pressure therein, a resistance device associated with said circuit for said electrically operated brakes comprising a row of normally spaced spring arms fixed at one end only thereof, a contact element fixed to the free end of each of said arms and said contact elements being normally spaced from one another, an electrical resistance element interconnecting each adjacent pair of said arms excepting only the pair of arms at one end of said row, the end arms of said row of arms being connected in series with said electrically operated brakes and said source of electrical energy therefor, and said movable element being operatively connected to said arm at said one end of said row and arranged to cause successive contact of said contact elements during continued movement of said movable element in one direction under the influence of increasing pressures in said hydraulic brake system, whereby to correspondingly successively short out said resistance means between said adjacent pairs of arms.

FREDERICK M. REID.